United States Patent
Korenev et al.

(10) Patent No.: US 6,764,657 B2
(45) Date of Patent: Jul. 20, 2004

(54) APPARATUS FOR IRRADIATING FOR FLUOROPOLYMER MATERIALS

(75) Inventors: Sergey Alexandrovich Korenev, Vernon Hills, IL (US); John Masefield, Far Hills, NJ (US); Jerry Kriebel, Lake Villa, IL (US)

(73) Assignee: Steris Inc., Temecula, CA (US)

( * ) Notice: Subject to any disclaimer, the term of this patent is extended or adjusted under 35 U.S.C. 154(b) by 297 days.

(21) Appl. No.: 10/014,386

(22) Filed: Dec. 11, 2001

(65) Prior Publication Data

US 2002/0060294 A1 May 23, 2002

Related U.S. Application Data

(62) Division of application No. 09/624,310, filed on Jul. 24, 2000, now Pat. No. 6,340,718.

(51) Int. Cl.[7] .................................. B01J 19/08
(52) U.S. Cl. ............. 422/186; 422/186.01; 422/186.04
(58) Field of Search ................... 422/186, 186.01, 422/186.04

(56) References Cited

U.S. PATENT DOCUMENTS

| 2,737,593 A | 3/1956 | Robinson ...................... 250/49 |
| 3,116,226 A | 12/1963 | Bowers et al. .............. 204/154 |
| 3,766,031 A | 10/1973 | Dillon ..................... 204/159.2 |
| RE28,628 E | 11/1975 | Carlson et al. .......... 204/159.2 |
| 4,036,718 A | 7/1977 | Brown et al. ............. 204/159.2 |
| 4,220,511 A | 9/1980 | Derbyshire .............. 204/159.2 |
| 4,586,995 A | 5/1986 | Stinnett et al. ................. 522/5 |
| 4,748,005 A | 5/1988 | Neuberg et al. ............. 422/186 |
| 5,296,113 A | 3/1994 | Luniewski ............. 204/157.15 |
| 5,444,103 A | 8/1995 | Tabata et al. ................... 522/5 |
| 5,473,165 A | 12/1995 | Stinnett et al. ......... 250/492.21 |
| 5,882,737 A | 3/1999 | Eckhoff ....................... 427/487 |
| 5,916,929 A | 6/1999 | Knobel et al. .............. 522/155 |
| 5,968,997 A | 10/1999 | Luniewski et al. ......... 522/156 |
| 5,985,949 A | 11/1999 | Seguchi et al. ................ 522/5 |
| 6,486,481 B1 * | 11/2002 | Tigera ..................... 250/492.3 |

FOREIGN PATENT DOCUMENTS

| EP | 339 111 | 11/1989 |
| EP | 801 095 | 10/1997 |

* cited by examiner

Primary Examiner—Kishor Mayekar
(74) Attorney, Agent, or Firm—Fay, Sharpe, Fagan, Minnich & McKee, LLP

(57) ABSTRACT

A source of radiation (10,12), particularly a pulsed accelerated electron beam, directs a beam of radiation through an irradiation chamber (14, 50). The irradiation chamber is depleted of oxygen and oxygen containing gases, such as being drawn to a vacuum of $10^{-1}$ or greater Torr by a vacuum pump (20, 52). Particulate fluoropolymer material is entrained (36) in substantially oxygen free gas and conveyed through the irradiation chamber. The accelerated electrons break chemical bonds in the fluoropolymer particles and electrostatically charge the particles. Magnetic fields (42, 60) of different polarity rotate the charged particles such that they are irradiated from different sides. The irradiated fluoropolymer particles are cooled (24) and separated (26) from the entraining gas. The entraining gas is recirculated through pneumatic line (34) for a continuous cycle.

11 Claims, 3 Drawing Sheets

APPARATUS FOR IRRADIATING FOR FLUOROPOLYMER MATERIALS

This application is a divisional of U.S. application Ser. No. 09/624,310, filed Jul. 24, 2000, now U.S. Pat. No. 6,340,718.

BACKGROUND OF THE INVENTION

The present invention relates to a method and apparatus for irradiating fluoropolymer materials. It finds particular application in conjunction with the irradiation of polytetrafluoroethylene (PTFE), fluorinated ethylene propylene (FEP), and chlorotrifluoroethylene (CTFE) to degrade their mechanical properties. It is to be appreciated, however, that the present application is also applicable to the radiation treatment of other polymeric materials to alter chemical resistance, electrical properties, thermal stability, surface properties, and other characteristics.

Finally, milled PTFE is used as a common additive to inks and to lubricants. However, PTFE is an extremely tough material with very strong bonds. It is extremely difficult to mill into a fine powder.

In order to facilitate the milling process, radiation has been used to break chemical bonds in the PTFE polymer chains. In one technique, Teflon material was placed in open containers in a cobalt 60 ($^{60}$Co) vault. Gamma rays from the cobalt 60 irradiated the PTFE for a duration which weakened the bonds sufficiently, typically on the order of several hours.

In another technique, PTFE material, in granules, sintered shavings, or other thin, small pieces was placed in an open tray. The tray was passed slowly through an accelerated electron beam irradiating the PTFE material. The product was raked or stirred and passed through the electron beam again.

These techniques have several drawbacks. First, a significant quantity of hydrogen fluoride (HF) gas is released into the atmosphere. Hydrogen fluoride is highly corrosive and toxic to workers in the environment. Other toxic and corrosive gases, including fluorene, are also released. Further, treatment of PTFE in open containers releases PTFE dust into the environment which settles on walkways and other surfaces. PTFE is an extremely slippery lubricant creating fall and other injury hazards to workers. Moreover, the PTFE dust in the environment can be breathed by the workers. The present invention contemplates a new and improved fluoropolymer material irradiations apparatus and method which overcomes the above referenced problems and others.

SUMMARY OF THE INVENTION

In accordance with one aspect of the present invention, a method of irradiating fluoropolymer materials is provided. Oxygen and oxygen containing gases are removed from an irradiation chamber. The chamber is irradiated with penetrating, ionizing radiation. The fluoropolymer material is passed through the ionizing radiation in the oxygen and oxygen containing gas depleted environment of the irradiation chamber.

In accordance with more limited aspects of the present invention, the gases removed from the irradiation chamber include air and water vapor.

In accordance with a yet more limited aspect of the present invention, the irradiation chamber is evacuated.

In accordance with another more limited aspect of the present invention, the penetrating radiation is accelerated electrons.

In accordance with another more limited aspect of the present invention, the fluoropolymer material is in particulate form and the particles are rotated by magnetic or electrical fields.

In accordance with a yet more specific aspect of the present invention, irradiation of the fluoropolymer particles by the electron beam charges the dielectric fluoropolymer particles creating rotational forces.

In accordance with another aspect of the present invention, an apparatus is provided for irradiating fluoropolymer materials. A radiation source generates a beam of radiation which passes through an irradiation chamber. A vacuum pump draws down oxygen, oxygen containing gases, water vapor, and other gases from the irradiation chamber. A source of fluoropolymer materials supplies a fluoropolymer material to the irradiation chamber.

One advantage of the present invention is that it reduces the generation of toxic and corrosive gases.

Another advantage of the present invention is that it reduces and substantially eliminates the distribution of dust and toxic substances into the environment.

Another advantage of the present invention resides in improved worker safety.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not be construed as limiting the invention.

DETAILED DESCRIPTION OF THE PREFERRED EMBODIMENTS

Figure 1:
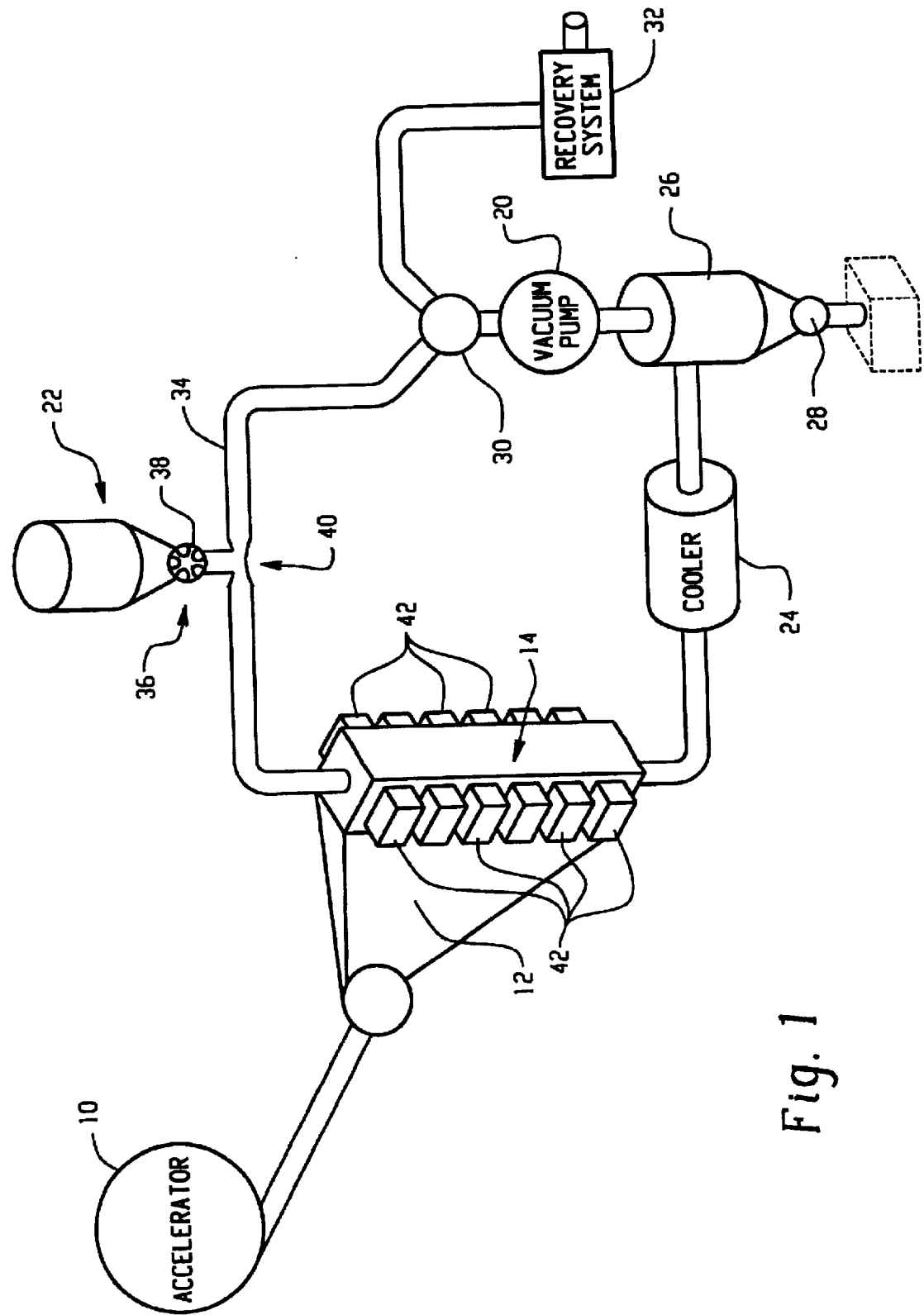
FIG. 1 is a diagrammatic illustration of a fluoropolymer material irradiation system in accordance with the present invention.

A particle accelerator 10 accelerates electrons, preferably in the 1–15 MeV range. A beam of the electrons are conveyed to a scan horn 12 which fans the electron beam out over an elongated region. An irradiation treatment chamber 14 is mounted immediately contiguous to the scan horn to receive the electron beam. Preferably, the irradiation chamber has a height and width which are commensurate with height and width of the fanned electron beam from the scan horn. To minimize electron beam losses, the scan horn and irradiation chamber are separated only by a thin foil layer, preferably aluminum foil.

The irradiation chamber 14 is interconnected with a vacuum pump 20 which removes air from the irradiation chamber. Preferably, the vacuum pump draws a vacuum on the order of $10^{-1}$ to $10^{-3}$ Torr. The irradiation chamber is also connected with a source 22 of fluoropolymer material. Preferably, the fluoropolymer material is in particulate, shaving, or flake form. The fluoropolymer material moves through the evacuated treatment chamber 14 at a controlled rate. Preferably, the material has a dwell time in the irradiation chamber of about one minute. On impact, the charged electrons not only break chemical bonds but also impact an electrical charge to the dielectric fluoropolymer particles.

After the fluoropolymer material has passed through the irradiation chamber, it passes through a cooler 24 which removes heat accumulated during the irradiation process. Cooling reduces the amount of gases generated. That is, at higher temperatures, particularly above about 110° C., the rate at which toxic gases are generated increases. The cooled and irradiated material passes to a separator 26, such as a cyclone separator, where it is deposited. The separator includes a vacuum sealed valve, such as a rotary pocket valve 28 through which accumulated irradiated fluoropolymer material is passed for receipt and appropriate packaging.

More specifically to the preferred embodiment, a valve 30 in one position connects an outlet port of the vacuum pump 20 through a filter and toxic gas recovery system 32 to the atmosphere while the system is drawn down to the preferred pressure level. After the system is drawn down to the preferred pressure level, the valve 30 connects the pump 20 to a pneumatic return path 34 extending to the fluoropolymer material source 22 to make a closed loop pneumatic path. The valve 30 can be operated intermittently to maintain the vacuum in the pneumatic path. An entraining mechanism 36 entrains the material into the low level of recirculated gas. The entraining mechanism may include, for example, a rotary pocketed vacuum valve 38 for passing the fluoropolymer material at a metered rate into the vacuum side of the system. A nozzle or venturi type arrangement 40 assists in entraining the material particles into the moving gas.

In order to agitate or stir the material particles as they pass through the reaction chamber, a series of magnets 42 of alternating polarity line the walls of the irradiation chamber. As each charged fluoropolymer particle moves into an opposite polarity region, the electromagnetic forces flip its orientation. The magnets are preferably strong magnets such as samarium cobalt or barium permanent magnets. Alternately, electrical coils can be placed on sides of the irradiation chamber to turn the electrostatically charged particles by electric field changes. Agitation can also be provided mechanically by baffles in the chamber 14.

Various alternate techniques are also contemplated for moving the material through the treatment chamber 14. For example, the material can be moved through the chamber with a mechanical conveyor, such as a belt or auger. As another example, the particles can fall by gravity. As yet another example, the material can be formed into ribbons or tubes that are pulled through the evacuated chamber. Numerous other conveying techniques will be apparent to those of ordinary skill in the art.

Figure 2:
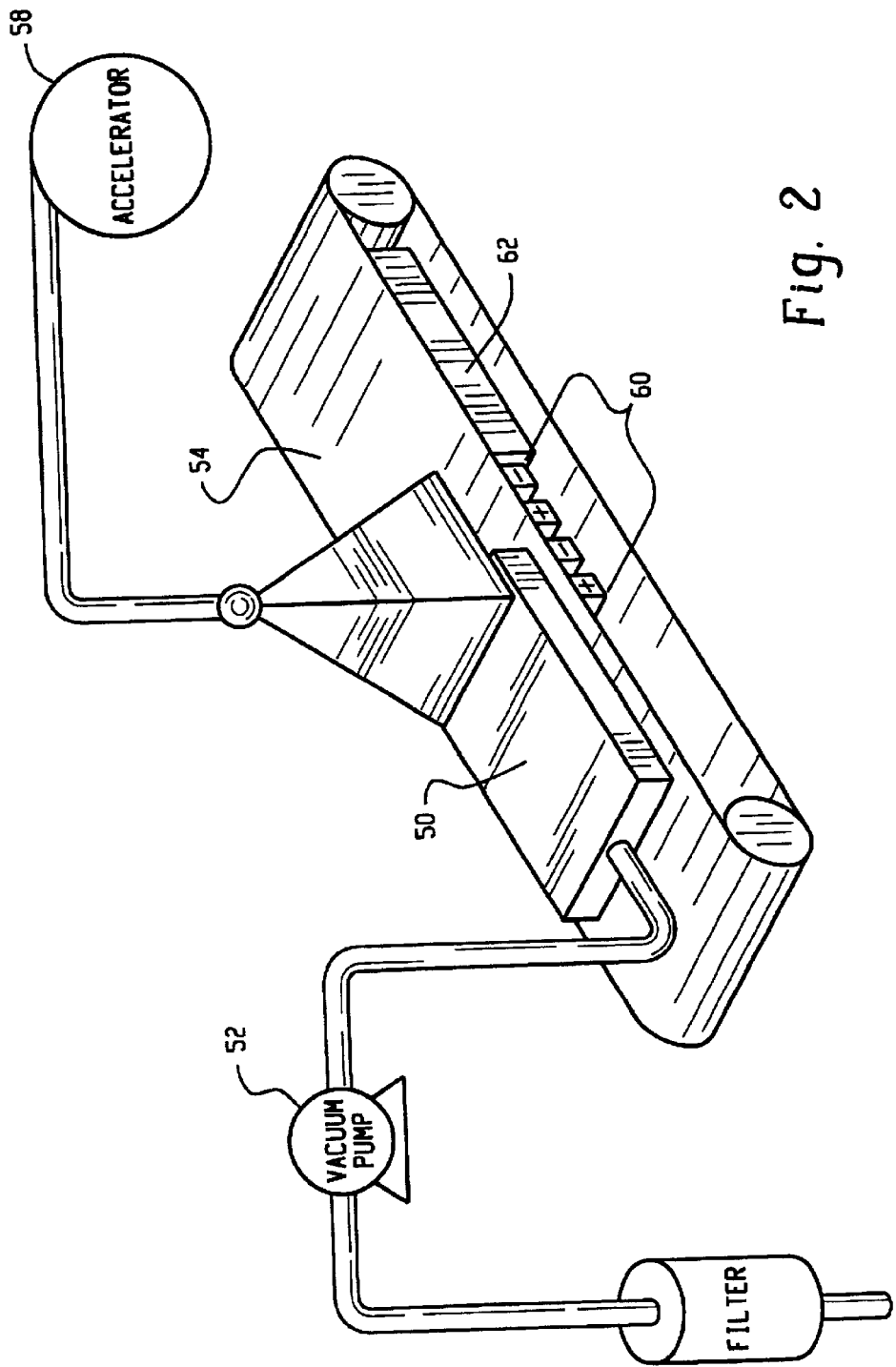
FIG. 2 is an alternate embodiment of a fluoropolymer irradiation system.

With reference to FIG. 2, in a batch-processing embodiment, fluoropolymer material in particulate or flake form is placed in a relatively flat, wide container 50 which is sealed to the environment. The container is connected to a vacuum pump 52 which draws a vacuum therein, again preferably on the order of $10^{-1}$ Torr or less. After evacuation, the container 50 is preferably disconnected from the vacuum pump. The evacuated container is placed on a flat belt or other conveyer system 54 for carrying the conveyer below a ceiling mounted scan horn 56. The container is passed through the beam one or more times until a selected dose is achieved. A pulsed particle accelerator 58 again accelerates particles which are focused and aimed by the scan horn through the material in the container 50. Electrical windings or magnets 60 of alternating polarity are disposed adjacent the scan horn for stirring or agitating particles in the container 50.

Optionally, a cooling system 62 is placed below the belt to cool the material that has been heated by the electron beam. Preferably, the electron beam has an energy in the 1–5 MeV range. The container is moved back and forth until the Teflon particles have received about 30–150 Mrad of radiation, more preferably 100–120 Mrad. This can typically be achieved with a total cumulative radiation time of about one minute.

The fluoropolymer materials have long fluorocarbon chains which are broken by the oxidizing effect of the electrons into smaller chains and chain segments including some short $C_2F_4$ chain segments. In the ionizing environment of the irradiation chamber, some of the short chains degrade into free or reactable carbon and fluorine molecules.

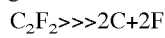

Analogously, water vapor in environmental air is also ionized:

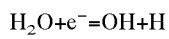

The free hydrogen and fluorine react to form hydrogen fluoride:

The remaining carbon and hydroxide radicals react to form carbon dioxide and hydrogen gas. Analogously, other $C_2F_4$ radicals react directly with oxygen from the air and free hydrogen from ionized water vapor to form —$CF_2COOOH$+ HF. By removing the oxygen and water vapor by drawing a significant vacuum, the amount of oxygen and water vapor available to engage in the reactions which form hydrogen fluoride are greatly reduced, greatly reducing the generation of hydrogen fluoride.

Even if a small amount of hydrogen fluoride and fluorine gases are still generated, such gases continue to be circulated through the system. A rise in the pressure due to these gases does not increase the generation of hydrogen fluoride or fluorine, so long as oxygen and water vapor are not introduced into the system. Alternately, rather than maintaining a vacuum, the system can be evacuated of oxygen and water vapor and replaced with an inert gas or other gas which does not adversely interact with fluoropolymer materials to form hydrogen fluoride or other toxic gases.

Optionally, other forms of radiation can be utilized, including gamma rays and higher energy x-rays. However, being lower in energy than the electron beam, gamma and x-radiation will require longer irradiation times to achieve the same degree of treatment.

The electron beam is preferably pulsed. Pulsing the electron beam provides alternate irradiation and cooling periods for the treated particles. Typically, the electron beam is scanned back and forth across the scan horn. The scanning, again provides intermittent irradiation or alternating irradiation and cooling periods. Typical e-beam radiation settings include 1.0–5.0 MeV electron beam with a pulsed beam current of 1–5 kA and a pulse duration of 10–500 n sec.

Although a vacuum of $10^{-1}$ to $10^{-3}$ Torr is preferred, higher vacuums achieve a further reduced rate of hydrogen fluoride and fluorine gas generation.

Figure 3:
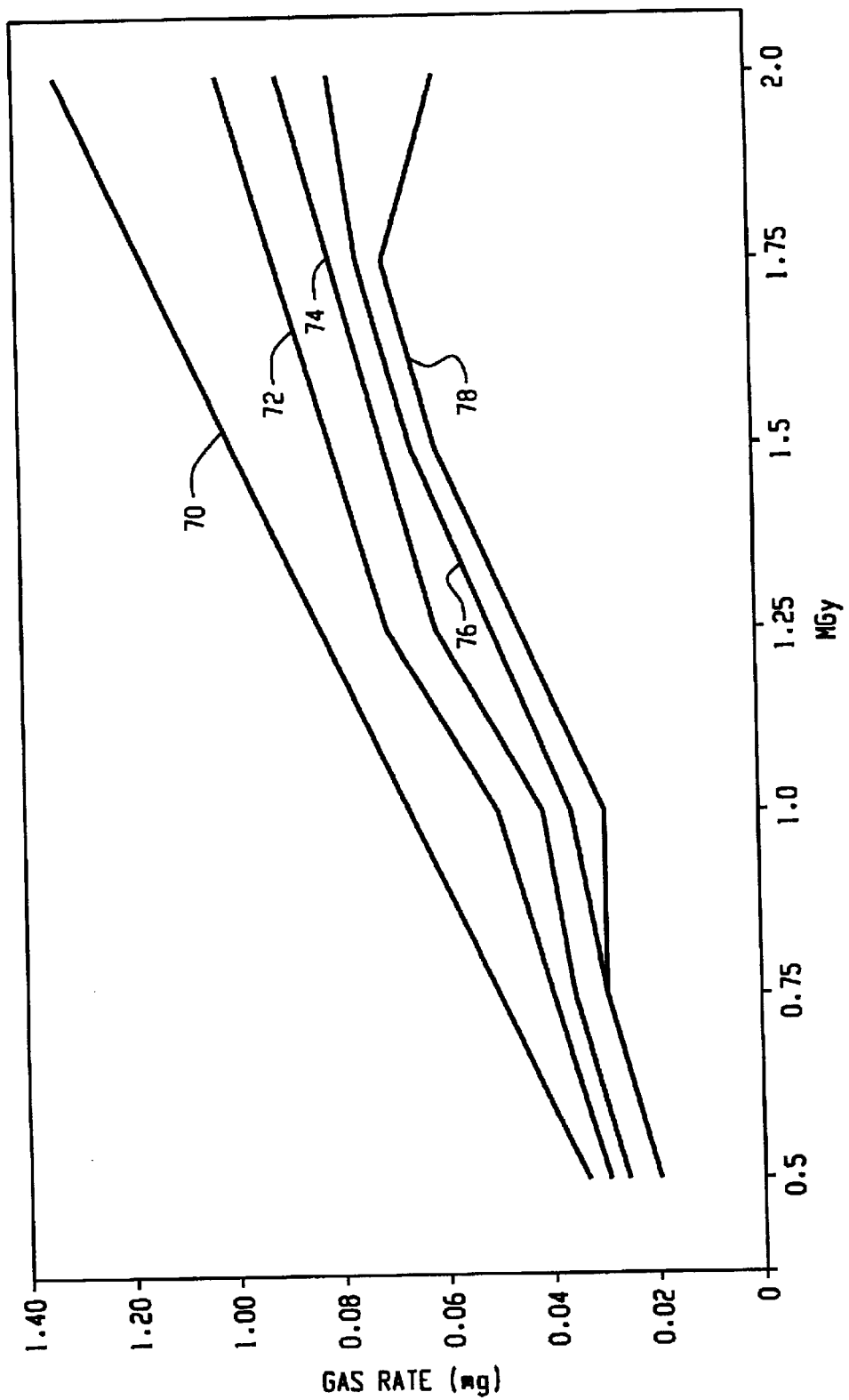
FIG. 3 is a graphic illustration of fluorine gas evolution rate versus radiation dose in air at atmospheric pressure and at vacuums of $10^{-1}$ to $10^{-5}$ Torr.

With reference to FIG. 3, curve 70 illustrates the rate of fluorine gas generation in milligrams per MGy of radiation dose in air at atmospheric pressure and at various vacuum levels. Curve 72 illustrates the generation rate of hydrogen fluoride versus dose for $10^{-1}$ Torr vacuum levels; curve 74 for $10^{-2}$ Torr; curve 76 for $10^{-4}$ Torr; and curve 78 for $10^{-5}$ Torr. It will be noted that while $10^{-1}$ torr produces satisfactory results, results at $10^{-2}$ torr are again significantly improved with a gas generation at $10^{-4}$ torr or lower greatly improved.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. An apparatus for irradiating fluoropolymer materials comprising:
   a radiation source for generating a beam of radiation;
   an irradiation chamber through which the beam of radiation passes;
   a vacuum pump for drawing down oxygen and oxygen containing gases from the irradiation chamber;
   a source of fluoropolymer material for supplying fluoropolymer material to the irradiation chamber;
   at least one of magnets and electromagnetic coils disposed adjacent the irradiation chamber for reorienting the fluoropolymer material.

2. The apparatus as set forth in claim 1 further including:
   a cooler for cooling the material which has been irradiated in the irradiation chamber.

3. The apparatus as set forth in claim 1 wherein the radiation source includes:
   a particle accelerator for accelerating electrons; and
   a scan horn for fanning the electrons into an electron beam directed into the irradiation chamber.

4. The apparatus as set forth in claim 1 wherein the radiation source is a pulsed electron accelerator.

5. The apparatus as set forth in claim 1 wherein the irradiation chamber with received fluoropolymer material is pumped downed to a vacuum of at least $10^{-1}$ Torr and further including a conveyor for conveying the irradiation chamber through the radiation beam.

6. An apparatus for irradiating fluoropolymer materials comprising:
   an entraining mechanism for entraining particulate fluoropolymer material into a stream of oxygen depleted gas;
   a pneumatic conduit for conveying entrained fluoropolymer material from the entraining mechanism to an irradiation chamber and maintaining the fluoropolymer material entrained in the oxygen depleted gas while in the irradiation chamber;
   a radiation source for generating a beam of radiation and directing the beam of radiation through the irradiation chamber to irradiate the particulate fluoropolymer material while the fluoropolymer material is entrained in the oxygen depleted gas;
   a separator disposed downstream from the irradiation chamber for separating the fluoropolymer material from the entraining gas;
   another pneumatic conduit for conveying the oxygen depleted gas from the separator back to the entraining mechanism; and
   a pump for circulating the oxygen depleted gas.

7. The apparatus as set forth in claim 6 further including:
   a chiller disposed between the irradiation chamber and the separator.

8. An apparatus for irradiating fluoropolymer materials, the apparatus comprising:
   a means for removing oxygen and oxygen-containing gases from an irradiation zone to create oxygen and oxygen-containing gas depleted environment;
   a means for applying at least one of electric and magnetic fields across the irradiation zone;
   a means for pulsing accelerated electrons through the irradiation zone.

9. An apparatus for irradiating fluoropolymer material, the apparatus comprising:
   an electron accelerator for generating and sending a beam of accelerated electrons through an irradiation zone breaking chemical bonds of the fluoropolymer material received in the irradiation zone and electrically charging the received fluoropolymer material;
   a means disposed adjacent the irradiation zone for applying at least one of electromagnetic and electrostatic fields which cause the charged fluoropolymer material in the irradiation zone to rotate.

10. An apparatus for irradiating fluoropolymer material, the apparatus comprising:
    a means for training pieces of fluoropolymer in gas depleted of oxygen and oxygen-containing gases;
    a means for passing the entrained fluoropolymer material through an irradiation zone and maintaining the fluoropolymer material entrained in the gas in the irradiation zone;
    an electron source for irradiating the entrained fluoropolymer material in the irradiation zone with accelerated electrons;
    a means for separating the entrained, irradiated fluoropolymer pieces from the gas;
    a gas recirculation loop connected with the entraining means such that the gas is recirculated through the gas recirculation loop to the entraining means.

11. An apparatus for irradiating fluoropolymer material, the apparatus comprising:
    an irradiation chamber through which polymer material to be irradiated is passed;
    a source of gas depleted in oxygen and oxygen-containing gases, the gas source being connected with the irradiation chamber to create and maintain an oxygen and oxygen-containing gas depleted environment in the irradiation chamber;
    an electron accelerator configured and disposed to intermittently send pulses of accelerated electrons through the irradiation chamber providing alternate irradiation and cooling periods for the fluoropolymer; and,
    an electric circuit for applying at least one of electromagnetic and electrostatic fields across the irradiation chamber.

* * * * *